Figure 1:
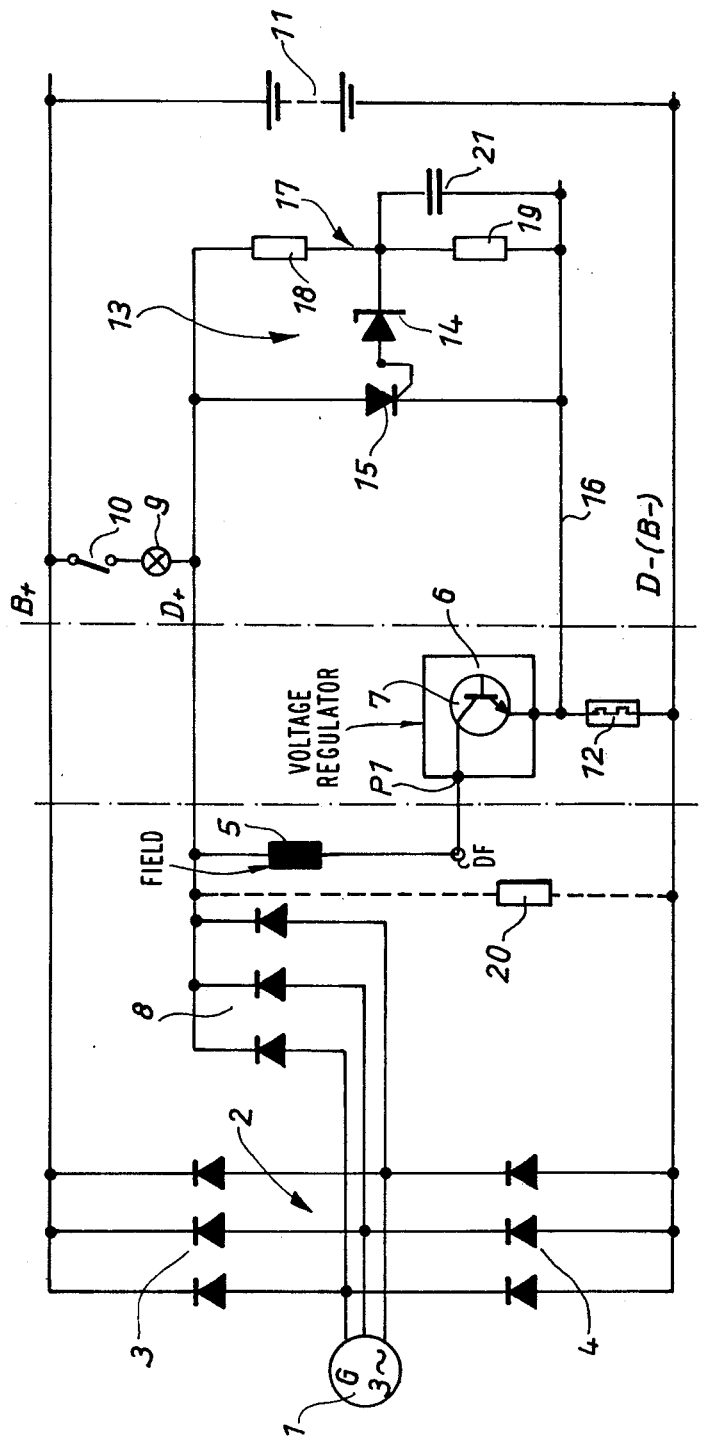

United States Patent [19]

Kuhn et al.

[11] 4,280,161

[45] Jul. 21, 1981

[54] OVER-VOLTAGE PROTECTED, SELF-CONTAINED MOBILE ELECTRICAL NETWORK SYSTEM, PARTICULARLY FOR AUTOMOTIVE APPLICATIONS

[75] Inventors: Edgar Kuhn, Gerlingen; Walter Kohl, Bietigheim; Günter Schramm, Vaihingen, all of Fed. Rep. of Germany

[73] Assignee: Robert Bosch GmbH, Stuttgart, Fed. Rep. of Germany

[21] Appl. No.: 6,922

[22] Filed: Jan. 26, 1979

[30] Foreign Application Priority Data

Mar. 16, 1978 [DE] Fed. Rep. of Germany ....... 2811440

[51] Int. Cl.³ .............................................. H02H 3/20
[52] U.S. Cl. ....................................... 361/18; 361/55; 361/56; 361/91; 361/104
[58] Field of Search ....................... 361/18, 55, 56, 91, 361/104; 340/638; 322/28

[56] References Cited

U.S. PATENT DOCUMENTS

| | | | |
|---|---|---|---|
| 3,332,006 | 7/1967 | Worrell et al. | 361/91 X |
| 3,529,211 | 9/1970 | Brayley | 361/91 |
| 3,857,084 | 12/1974 | Allport | 322/28 |
| 3,938,005 | 2/1976 | Cummins | 361/91 X |

*Primary Examiner*—Harry E. Moose, Jr.
*Attorney, Agent, or Firm*—Frishauf, Holtz, Goodman & Woodward

[57] ABSTRACT

To protect the battery in an automotive electrical system against over-charging upon failure of the voltage regulator to control current flow through the field of an automotive alternator, the field current is conducted through an interruptable network element, for example a fuse or a relay controlled switch. A voltage sensing network, for example a Zener diode, is connected to control current flow through a controlling element, for example a thyristor, which provides either an auxiliary current to burn out the fuse or a control current to the relay coil to interrupt connection to the field if over-voltage has been sensed. Simultaneously, an indicator lamp can be energized to indicate malfunction of the voltage regulator.

4 Claims, 2 Drawing Figures

OVER-VOLTAGE PROTECTED, SELF-CONTAINED MOBILE ELECTRICAL NETWORK SYSTEM, PARTICULARLY FOR AUTOMOTIVE APPLICATIONS

The present invention relates to a self-contained mobile electrical network system, and more particularly to a network system for installation on automotive vehicles, boats, or the like, in which the output voltage of an alternator is controlled by repetitively energizing the field winding of the alternator.

BACKGROUND AND PRIOR ART

Self-contained electrical network systems are used frequently on board of a automotive vehicles, boats, or the like, and typically are supplied with power from electrical generators which have a battery connected to the output to supply power when the generator is not operating and, in some cases, also excitation voltage. In typical installations, the generators are three-phase alternators, driven from an internal combustion (IC) engine with a stationary armature. A rotating field is provided, supplied with current over slip rings. The field current is supplied in pulses under control of a voltage regulator. Customary voltage regulators frequently use a semiconductor element, typically a power transistor, to control the current flow through the field winding of the alternator in dependence on output voltage. The output voltage of the alternator is compared with a reference value, for example by use of a Zener diode, which causes the transistor to become conductive if the voltage drops below the reference value and to block the transistor if the voltage exceeds the reference value.

If the controlling element of the voltage regulator, for example the power transistor, or a similar switching element which may be a solid-state switching element, becomes defective and remains continuously conductive, for example, in case of a power transistor if the transistor is short-circuited or alloys, field current is continuously supplied to the field of the alternator causing the generator voltage to rise to excessive levels. The mobile power supply systems have batteries which, if they are charged with voltages in excess of their design or nominal value for an excessive period of time become hot and, due to the constant over-charge, will lose battery fluid and eventually will be damaged or even destroyed by the continued over-charge. The customary indicating systems which are used in automotive application provide for an indication, for example by illumination of a control lamp, that the alternator is not supplying sufficient current to the battery to keep the battery charged and to supply loads thereto; these systems do not, however, indicate to the operator that the voltage regulator became short-circuited and that the battery is being over-charged. Damage to the voltage regulator in the sense of a continuously conductive voltage regulator, is usually not noticed until the electrolyte of the battery is so depleted that the battery already is damaged or destroyed. So long as some electrolyte remains, the various loads connected to the electrical system will operate since the generator continues to supply power. Charge indicator lamps in automotive electrical systems are usually so connected that the positive battery terminal is connected to the positive field terminal and if the field voltage and battery voltage are essentially the same—a condition which pertains when the alternator is charging—the lamp will be extinguished. The operator, therefore, does not have a device which permits monitoring of proper operation of the voltage regulator both with respect to under-charging as well as with respect to overcharging of the battery.

THE INVENTION

It is an object to provide a monitoring system for self-contained electrical network systems in which over-voltage conditions can be sensed and, if they occur, current through the field winding of a generator supplying the system is disconnected to prevent damage to the battery which forms part of the system.

Briefly, the field winding is connected to a circuit component such as a fuse, a switch, preferably a relay controlled switch, or the like, which is caused to burn out or to open upon sensing of over-voltage conditions. The over-voltage conditions themselves can be sensed by means of a Zener diode which, upon breakdown, controls a control element, for example a thyristor, to supply burn-out current to a fuse or to control the relay coil of a relay to open the circuit through the field. Simultaneously, a charge indicator lamp or a separate indicator lamp can be caused to light so that the operator will be warned that malfunction exists in the electrical system. Of course, disconnection of the field from the alternator causes loss of charge to the battery so that the remaining operating range of the vehicle will be limited if engine operation depends on electrical supply, for example to supply ignition energy thereto. Yet, under usual conditions, the battery will hold sufficient charge to permit continued operation of the vehicle for some time, for example to reach a repair station or other assistance.

The system has the advantage that malfunction of the voltage regulator by continued conduction thereof is sensed and destruction of or damage to the battery or other connected elements, due to excessive supply voltage and over-charge of the battery, is avoided. The excitation of the generator is interrupted so that the generator voltage drops to zero.

The system readily permits use of the customary charge control lamp to indicate malfunction in the charging system by providing a connection resistor which permits a bypass current of sufficient current carrying capability to cause the charge indicator lamp to light. A separate "voltage regulator shorted" indicator lamp also can be provided.

Use of a fuse in series with the voltage regulator, which is burned out by a separate burn-out current supplied as a function of output voltage, is a simple and easily connected control element. Upon sensing of over-voltage, a short circuit current between the terminals of the battery is deliberately conducted through the fuse to cause the fuse to burn out; this short circuit current is greatly in excess of the normal current flow through the field of the alternator and the fuse dimensioning and operating characteristics therefore are essentially non-critical.

DRAWINGS

Figure 2:
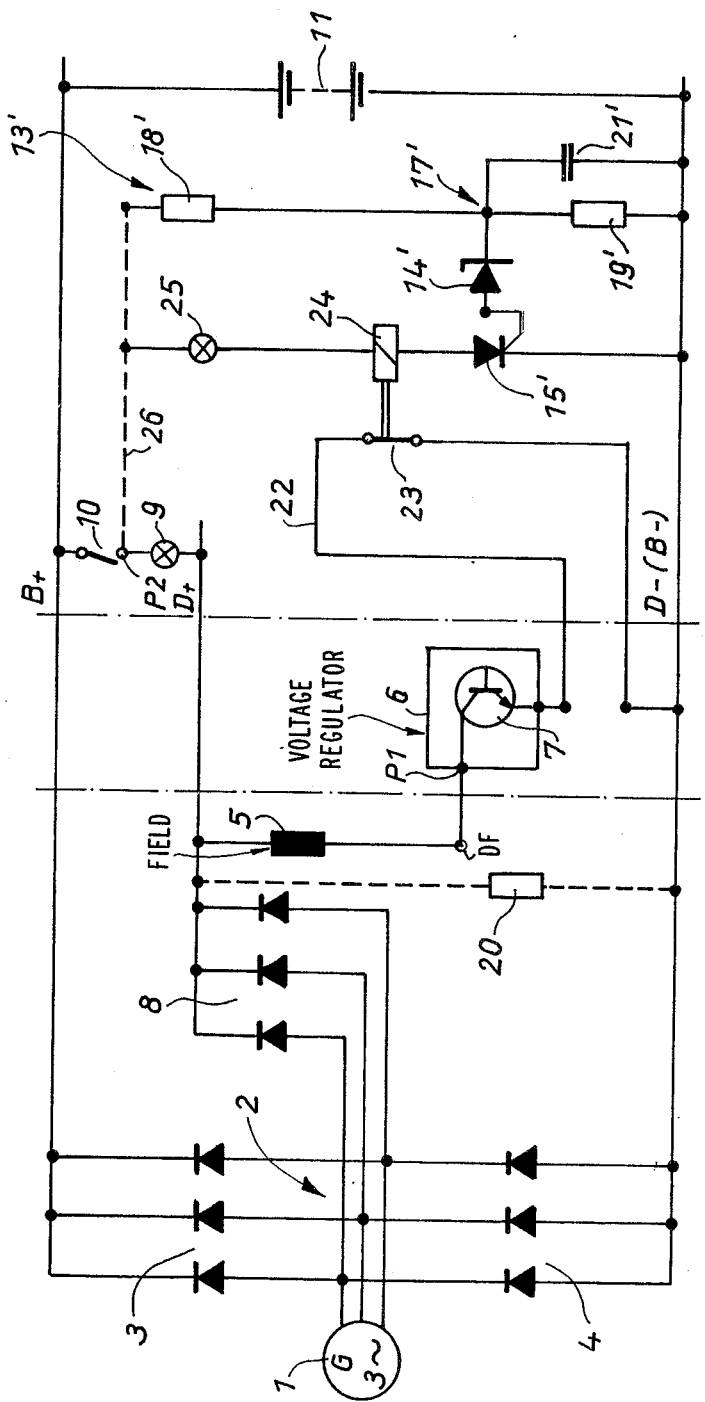

Illustrating two examples:

FIG. 1 is a schematic diagram of an automotive on-board electrical network with the over-voltage control circuit of the present invention connected thereto; and FIG. 2 is a circuit diagram similar to that of FIG. 1 and illustrating another embodiment.

The invention is applicable to various types of electrical generator systems in which over-voltage conditions due to excessive field current is to be detected; it will be explained in connection with a typical automotive-type electrical supply system. Application of the system to other fields will then be clear.

A three-phase alternator G has three armature windings collectively shown at 1 and respectively connected to a three-phase bridge rectifier formed of a set of positive diodes 3 and a set of negative diodes 4, to provide output power at respective terminals B+ and B−. In addition to the power rectifier array 2 formed by the diode sets 3, 4, an additional set of diodes 8 is provided to supply field current to the field winding 5 of the alternator G. The flow of field current through the field winding 5 is controlled by a voltage regulator 6. The voltage regulator 6 may be of any known construction; its output or power circuit has a controlled switch 7 therein, typically a transistor which is controlled to become conductive or to block in dependence on output voltage appearing across the terminals B+ and B− or the voltage between the exciter diode set 8, measured at the terminal D+ and D−, the latter being the same terminal as the terminal B−. The type of voltage regulator, and its internal construction, is not here material and may be any well known mechanical or solid-state voltage regulator. The field 5 is connected to a terminal DF, in accordance with well known notation, which is the same as terminal P1 of the voltage regulator 6. The material portion of the voltage regulator 6, for the purposes of the present invention, is the output switch 7 which opens and closes to provide power of selective duty cycles to the field 5 as determined by comparison of the output voltage with a reference.

A charge control lamp 9 is connected through a switch 10 which, in an automotive vehicle, is the ignition switch, between the connection of the exciter diodes 8, that is, terminal D+ and the output power line from the diodes 3, that is, terminal B+. Lamp 9 will light if the voltage between the terminals B+ and D+ exceeds a certain level. The output from the alternator G and available between terminals B+ and B− is used to supply various loads (not shown) and additionally is permanently connected to a battery 11 which supplies power to the loads when the alternator G is not running, for example when its driving engine is stopped. Under ordinary normal operating conditions, the voltage across terminals B+ and B− so controls voltage regulator 6 that the battery 11 is properly charged without, however, permitting the voltage to rise to a level which may cause an overcharge of the battery. In accordance with the present invention, a circuit interrupting element 12, shown as a fuse in FIG. 1, is connected in series with the circuit supplying current to the field 5, typically in series between voltage regulator 6 and the B− or chassis connection of the network system. The fuse 12 is controlled to burn out if the switch 7, as shown the transistor, should become continuously conductive so that the terminal P1 of the voltage regulator is permanently connected to ground or chassis, causing maximum excitation current to flow continuously through the field winding 5. Such continuous current flow would result in excessive charge voltage being supplied to the battery 11 and damage thereto and its eventual destruction.

The interrupting element 12 is normally conductive and introduces practically no resistance in the supply circuit to the field 5. Normal operation of the power system for the vehicle thus is not impaired.

Continuity of conduction of current of the circuit element 12, typically the fuse, is controlled by an over-voltage sensing circuit 13. Circuit 13, functioning as a monitoring circuit, senses the voltage at the terminal D+ which, essentially, is identical to the voltage of the positive current supply bus at B+, and compares this voltage with a reference value. The comparison is done by a Zener diode 14 connected to the tap or junction point of a voltage divider 17 formed of resistors 18, 19 and connected between the D+ bus and the junction between voltage regulator 6 and the fuse 12, represented by a connecting line 16. The comparison voltage can also be derived at other points in the network, for example directly from between buses D+ or B+ and B−. The monitoring circuit 13 additionally includes a semiconductor switch, typically a thyristor 15, connected in parallel to the circuit formed by the field 5 and the voltage regulator 6. A capacitor 21 bridges at least one of the resistors 18, 19 of voltage regulator 17.

Operation: If the voltage regulator 6 is functioning properly, the system will operate as well known in connection with automotive electrical supply systems. If the transistor 7 or another similar switching element should alloy or otherwise short-circuit so that it will become continuously conductive, the generator voltage at D+ will rise; when the level of the voltage reaches the breakdown voltage of Zener diode 14, as divided and applied at the tap point of the voltage divider 17, thyristor 15 will fire and become conductive. This short-circuits the buses D+ and B− and causes short circuit current to flow through fuse 12. The fuse 12 will burn out and interrupt the circuit to the field. This causes the alternator G to lose excitation, and the alternator voltage will drop to approximately zero.

Although not necessary, it is preferred to connect a resistor 20 between the terminals D+ and B− in order to provide a closed circuit path for the lamp 9 through switch 10 even after interruption of the circuit through field 5 so that the charge control lamp will light. The charge control lamp will remain lit and indicate a defect in the charge system immediately upon burn-out of fuse 12, that is, immediately upon clearing of the defective voltage regulator 6 from the circuit.

The charge control lamp 9, remaining brightly lit, thus will indicate to the operator not only failure of the alternator to supply current to battery due to defects in the alternator or in the voltage regulator based on under-voltage conditions, but also defects of the voltage regulator which could become destructive to the battery and to the electrical system and elements connected in the network.

The capacitor 21, preferably connected across resistor 19, prevents application of stray voltage peaks to the Zener diode 14 and hence undesired random and erroneous response of the thyristor 15 although the regulator 6 is functioning properly and is in order. Such stray voltage peaks may be caused due to switching transients, and the like, occurring in the on-board network. The capacitor provides for filtering of such peaks and prevents breakdown of Zener diode 14 due to short-time transients.

Embodiment of FIG. 2: This embodiment is essentially identical to that of FIG. 1 and identical elements have been given the same reference numerals and will not be described again; similar elements have been given reference numerals with prime notation.

The circuit of FIG. 2 differs from that of FIG. 1 in that a connecting line 22 from the voltage regulator 6 is provided, connected not to a fuse 12 but, rather, to a normally closed (NC) switch terminal 23 which is controlled by a relay coil 24. The relay coil 24 is connected in series with the main current path of thyristor 15'. Thyristor 15' is serially connected between the terminals B+ and B−. The voltage divider 17' likewise is connected between the terminals B+ and B−, and contains resistors 18', 19' forming a junction which is connected to a Zener diode 14'. There is no change in response of the monitoring circuit 13'. If voltage regulator 6 becomes defective by being continuously conductive, Zener diode 14' will respond and relay coil 24 will be energized, breaking the NC connection through terminal 23 between the voltage regulator 6 and the chassis or B− bus. Excitation of the alternator thus is interrupted. Indication of malfunction can be through the charge control lamp 9 if resistor 20 is provided, connected as shown. An additional indication or an indication in lieu of that provided by resistor 20 is possible, by connecting a lamp 25 in series with the thyristor 15' and the relay coil 24. Thus, an additional indicator lamp is provided which can indicate the nature of the malfunction of the voltage regulator. This circuit has the advantage that, if the malfunction of the voltage regulator 6 is temporary, for example self-healing due to a sticking relay, the circuit can be cleared by disconnecting one of the connecting cables to the battery 11. It is also possible, and recommended, to provide an additional control line 26 from terminal P2 of the ignition switch 10 to the lamp 25. Line 26 then will be energized only when the ignition switch 10 is closed. Upon opening of the ignition switch 10, the monitoring circuit is then disabled and will reset, for repeated operation and supervision of proper operation of the voltage regulator upon reclosing of switch 10. Capacitor 21' is used similarly to capacitor 21, FIG. 1.

Various charged and modifications may be made, and features explained in connection with any one of the embodiments may be used with any of the other, within the scope of the inventive concept.

We claim:
1. Overload protected, self-contained mobile electrical network system having
  two d-c terminals;
  an electrical generator (G) having its output connected to the d-c terminals and further having a field winding;
  a storage battery (11) connected to the d-c terminals of the network and to the output of the generator to store electrical energy therein;
  a voltage regulator (6) connected to sense the output voltage of the generator and intermittently controlling current flow through the field winding (5) thereof;
  and an over-voltage control circuit to prevent damage to the battery connected to the generator and to continuously and positively interrupt current flow to the field winding of the generator upon short circuit within the voltage regulator including
  a fuse (12) connected in series with the field winding (5) of the generator and to one (−) terminal of the network;
  and means providing a control current to said fuse independently of said voltage regulator under over-voltage conditions of said network,
comprising
  a thyristor (15) having one terminal of its main current carrying path connected to the other d-c terminal (+) of the network;
  a branch circuit (16) from the other terminal of the main current carrying path of the thyristor to the fuse (12) at a point remote from said one d-c terminal (−);
  a Zener diode providing a reference voltage, connected to and controlling application of a trigger voltage to the gate terminal of the thyristor to cause the thyristor to become conductive when the output voltage from the generator has a prohibited excess relationship with respect to said reference voltage, whereby conduction of said thyristor will apply short circuit current directly from said other d-c terminal (+) of the network through the branch circuit (16) to the fuse and to the one d-c terminal (−) of the network to cause the fuse to burn out under loading by said short circuit current and thereby interrupt current flow to the field winding (5) regardless of the conduction condition of the voltage regulator.

2. System according to claim 1, further including a voltage divider (17, 18, 19) connected to an output of the generator (G),
  the Zener diode (14) being connected to the tap point of the voltage divider and providing said reference voltage as a function of the voltage on the tap point (17) of the voltage divider.

3. System according to claim 1, further including a voltage divider (17, 18, 19) connected to an output of the generator (G),
  the Zener diode (14) being connected to the tap point of the voltage divider and providing said reference voltage as a function of the voltage on the tap point (17) of the voltage divider;
  and a filter capacitor (21) connected across at least one of the resistors (19) of the voltage divider to prevent spurious response of the Zener diode to short-time stray voltage peaks or interference pulses.

4. System according to claim 1, for use in a vehicular on-board electrical network supply system, wherein the generator (G) is a three-phase alternator and includes a rectifier array (2, 3, 4) rectifying the output from the alternator and providing said rectified output to the battery (11), the rectifier including a diode array (8) providing rectified current to the field (5) thereof;
  a charge indicator lamp (9) is provided connected between the supply terminal from the field rectifier array to the field and the output of the rectifier supplying current to the battery;
  and further comprising, in accordance with the invention, a bleeder resistor (20) connected between the field terminal and the other output terminal of the rectifier array, and hence of the battery, to provide an energization current to the indicator if current flow through the field (5) is interrupted upon conduction of said thyristor (15) and consequent interruption of the field current by said fuse 12.

* * * * *